United States Patent [19]

Batchelder

[11] Patent Number: 5,653,925

[45] Date of Patent: Aug. 5, 1997

[54] METHOD FOR CONTROLLED POROSITY THREE-DIMENSIONAL MODELING

[75] Inventor: John S. Batchelder, Somers, N.Y.

[73] Assignee: Stratasys, Inc., Eden Prairie, Minn.

[21] Appl. No.: 533,793

[22] Filed: Sep. 26, 1995

[51] Int. Cl.$^6$ .................................................. B29C 41/02
[52] U.S. Cl. ........................... 264/113; 156/62.2; 264/308
[58] Field of Search .............................. 264/41, 113, 308, 264/401, 497; 156/62.2

[56] References Cited

U.S. PATENT DOCUMENTS

| | | | |
|---|---|---|---|
| 4,665,492 | 5/1987 | Masters | 264/401 X |
| 5,204,055 | 4/1993 | Sachs et al. | 264/113 X |
| 5,303,141 | 4/1994 | Batchelder et al. | 264/401 X |
| 5,340,656 | 8/1994 | Sachs et al. | 428/546 |
| 5,490,962 | 2/1996 | Cima et al. | 264/401 |
| 5,518,680 | 5/1996 | Cima et al. | 264/401 |

*Primary Examiner*—Leo B. Tentoni
*Attorney, Agent, or Firm*—Moore & Hansen

[57] ABSTRACT

A method of making a three dimensional object by depositing material in a predetermined pattern on a receiving surface, and introducing a predetermined porosity into the object being formed by positioning the deposited material so as to introduce pockets of air or other fluid into the part, and by adjusting the rate at which the material is dispensed from the dispenser. Optimal porosities in the object to be built depend upon the shape of the material when it is dispensed, but range generally from 1% to 26%.

16 Claims, 3 Drawing Sheets

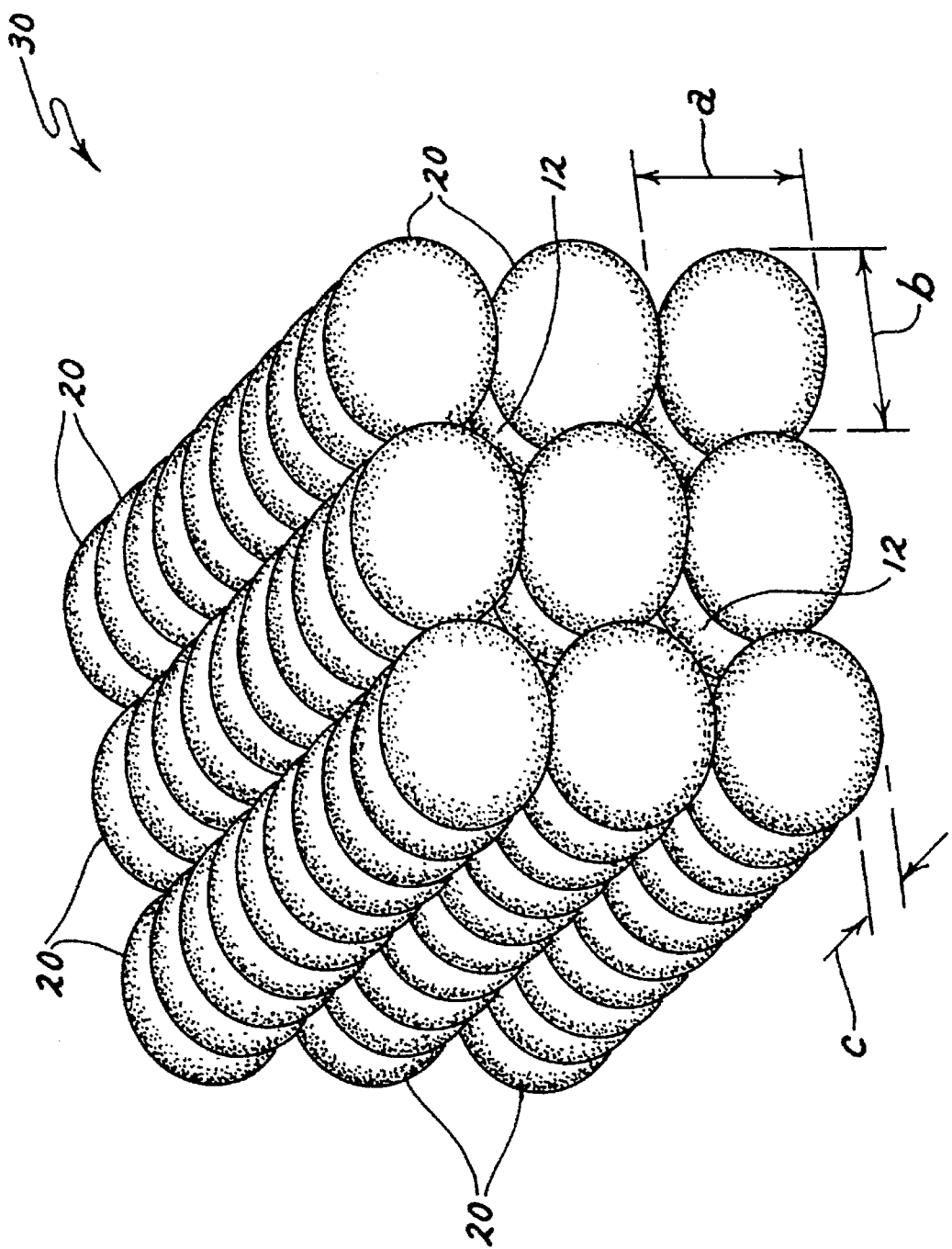

METHOD FOR CONTROLLED POROSITY THREE-DIMENSIONAL MODELING

BACKGROUND OF THE INVENTION

The present invention relates to the field of three-dimensional prototype modeling. Specifically, it relates to a method of producing a prototype model having a set non-zero porosity determined by the type of packing pattern used to build the part.

To build an acceptable part, placement of sequentially applied material must currently be tightly controlled, because any errors in its placement will create dimensional errors that propagate throughout the part. Further, it is very difficult to accurately determine the impact of material placement errors at one layer on the accuracy of different layers of an article.

In ideal conditions for three-dimensional prototype modeling using continuous element deposition, if a deposition gun or extrusion head extrudes a bead of uniform area A at all extrusion speeds and if the bead trajectories are designed so that the beads have a horizontal spacing between them of "b" and a vertical spacing between them of "a," and A=ab, then a part having the proper dimensions will be produced. In discrete element deposition, if a deposition jet deposits droplets of volume V and the impact locations have a horizontal spacing between them of "b" and "c" and a vertical spacing of "a", then if V=abc, a part having the proper dimensions will be produced.

However, ideal conditions rarely exist, and numerous problems with accuracy of solid part dimensions are introduced into rapid prototyping processes. For example in continuous bead deposition, if a displacement pump is not used, the amount of material extruded per unit time depends non-linearly on the rate at which the pump is operated. In both continuous and discrete element deposition, in areas of high surface curvature physical characteristics of the material cause gaps between the beads; these physical characteristics include internal viscosity, surface tension, and rapid solidification.

In continuous bead extrusion rapid prototyping, there are two limiting cases for packing patterns for beads: rectangular and hexagonal. In a rectangular packing, the bead material must flow into 90 degree corners having infinitesimal radii to completely fill the volume. Problems occur in hexagonal packing, where the corners are 120 degrees. Beads are typically too viscous to fill in the 120 degree corners.

Another problem is that extrusion material varies from batch to batch. Further, material changes characteristics as it sits in a heated pot, because of absorption of and reaction with such things as water and oxygen from the air. All of the effects on the batches tend to cause the amount of material extruded in a bead or droplet at given pump speed to vary not only between batches, but also within batches.

Still another problem is that errors introduced into parts tend to propagate through the parts. Any error in a part, such as a lag or an excess of extrudate, will recur on all subsequent layers if the material is metered exactly. If a similar error occurs adjacent the first, the problem may even get worse in subsequent layers.

Extruded beads also change after extrusion. In continuous extrusion the material contracts as it cools; in addition beads contract axially and expand radially after being forced through the nozzle. For all of the above mentioned reasons, it is difficult to define exactly what the volumetric extrusion rate for a three-dimensional prototype modeling system is at any given time. It is also difficult to determine how one bead layer will lay on the next, due to the inherent uncertainty in the base layer.

There are several types of prototyping currently in use. Continuous extrusion based rapid prototyping involves depositing segments of continuous roads, ribbons, or beads of material onto a platform to sequentially build up an object. A cross section in a vertical plane of a number of such locally parallel beads normal to their axis will find that there are two limiting cases for how they can be packed together, namely in a rectangular array or in an hexagonal array. In the first case a longitudinal gap or pore tends to form along the line where four beads are nearest neighbors, and in the second case the pore forms along the line where three beads are nearest neighbors.

Lamination based rapid prototyping involves depositing shaped sheets or films to sequentially build up a solid object. Nominally these sheets join on continuous planes so that porosity is not necessarily present. Texturing the sheets with grooves or holes will introduce porosity that will help in lost wax casting applications, as described in the subsequent section. With this exception, parts manufactured with sheet laminations generally have zero porosity.

Discrete element extrusion based rapid prototyping involves depositing droplets or particles of material from a nozzle or projector so that the droplets sequentially build up a solid object. A cross section through such an object from any direction will show voids of some size at the locations where three, four, or even more droplets are nearest neighbors.

The techniques that we will subsequently describe for controlling rapid prototyping processes can be applied to several existing technologies. A brief review of these technologies shows that their practitioners have not realized the benefits of deliberately introducing porosity, especially at optimal levels.

For example, Batchelder et al. (U.S. Pat. No. 5,303,141) is silent on the role of part porosity. FIGS. 9a–9c of Batchelder et al. depict beads deposited at the maximum possible porosity (cylindrical beads in line contact with their neighbors), which is not the preferred embodiment for practical part building.

Fujimaki et al. (Japan application 62-234910) shows a solid object being constructed from spherical particles in FIG. 4 and in the supporting text. Such a part has a greater porosity than is recommended. FIG. 4 shows a body centered cubic lattice of spheres creating the object, which would have a porosity of almost 45%. Each sphere would have only a point contact with its six nearest neighbors, which would create a weak part. FIGS. 6a and 6b show other part cross sections, where again the parts seem to be comprised of spheres in point contact.

Masters (U.S. Pat. No. 4,665,492) shows in FIGS. 2a–2c that material deposited by ink jet like mechanisms will have some residual porosity, but is silent on the importance or optimization of that porosity.

The patents to Sachs et al. (U.S. Pat. Nos. 5,204,055 and 5,340,656) apply binder with an ink jet to a powder to make three dimensional parts. While there is an assumption that the powders are porous so that the binder fluid will wick into the powder, the patent is silent on any role or importance of porosity.

BRIEF SUMMARY OF THE INVENTION

It is an object of the present invention to provide a process for adjusting the deposition rate of three-dimensional modeling material to provide a finished article having a predetermined porosity greater than zero, in an optimal range for overall part strength, use of materials, improved post processing, and dimensional accuracy.

It is another object of the present invention to provide a process capable of building a model from material in the form of various elements including roads, beads, ribbons, droplets, particles, and sheets.

The present invention accomplishes these objectives by providing a method of making a three-dimensional article by dispensing a solidifiable material in a predetermined pattern, with elements of the material positioned to provide fluid pockets between the elements, and adjusting the rate of dispensing of the material to provide porosity within a predetermined range.

Rapidly prototyped parts are best formed in deposition based rapid prototyping systems when residual fluid pockets are dispersed throughout the part. These fluid pockets or voids should be contained in the nominally solid portions of the parts. While such parts are less strong and dense than non-porous parts, they are more dimensionally accurate, they allow parts to be built with a wider range of materials, they are less prone to breaking ceramic molds during lost wax casting, they can be created more repeatedly, and they can in some cases allow co-machining steps to be eliminated.

When building up a three dimensional solid article from a computer aided design (CAD) file by adding material in discrete or continuous extrusions, there are advantages in deliberately and systematically applying less material than would completely fill the interior of the part as defined by the CAD file. It is not necessary to completely fill solid all regions of the part. Fluid pockets between the extruded beads form an adjustable buffer.

The present invention provides a method to correctly and efficiently account for variations in the extrusion rate and element positioning that would otherwise lead to unacceptable parts. It does so by introducing a porosity into the part during manufacture. This porosity should be confuted within a range to allow reliable part strength. The introduction of porosity into parts allows the creation of a part that is insensitive to the small changes present in extrusion rates between and within batches. It further allows higher viscosity and surface tension in the extrudate, and provides an expansion cushion within the part to help prevent mold breakage during lost wax casting. Also, additional process steps such as co-machining may be eliminated.

These and other objects and benefits of the present invention will become apparent from the following detailed description thereof taken in conjunction with the accompanying drawings.

BRIEF DESCRIPTION OF THE DRAWINGS

FIG. 3 is an isometric view of a rectangular array of droplets.

DESCRIPTION OF THE PREFERRED EMBODIMENT

Figure 1:
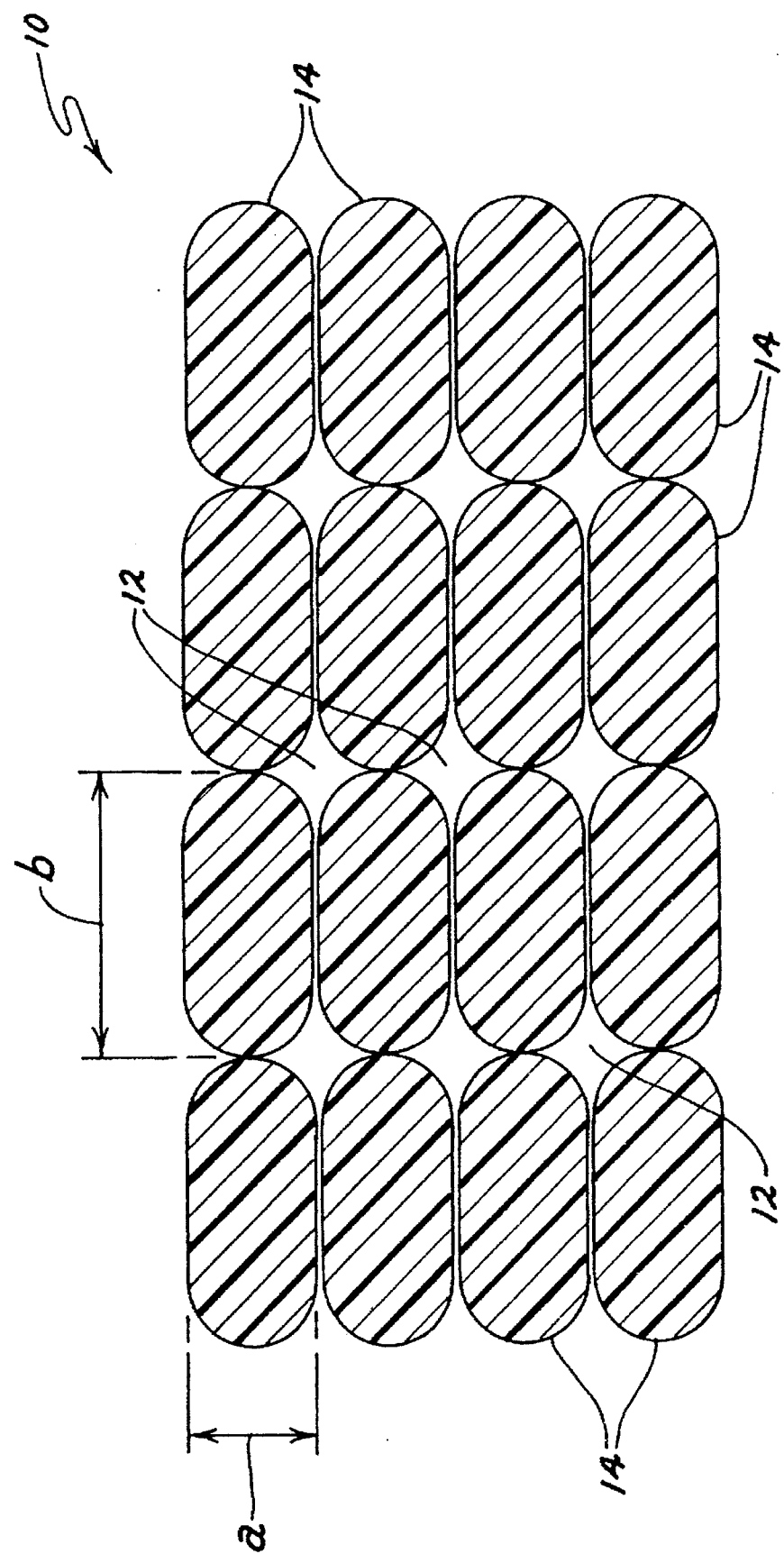
FIG. 1 is a vertical section view of a rectangular array of beads.

A computer aided design (CAD) file prescribing a three dimensional solid object such as objects 10, 16, and 30 typically contains surfaces bounding solid portions of the object. If a rapid prototyping system uses some building material with a density $\rho$ to build that object so that only that building material exists within the corresponding surfaces of the prototype, then the resulting part has a density of $\rho$ and it has a porosity of zero. Note that all of the solid regions of the part are 100 percent building material. If all of the solid regions of the part have systematic pores 12 that contain some other material, such as the fluid that fills the build volume prior to building the object (say that fluid has a density $\rho_{air}$, since air is the most common fluid used in application), then the resulting part might have a density of $\rho_{part}$ and a porosity (P) of:

$$P = \frac{\rho - \rho_{part}}{\rho - \rho_{air}} \quad \text{[Eq. 1]}$$

The pores such as pores 12 might be filled with a variety of fluids such as nitrogen, argon, water, oil, UV curable monomer, vacuum, water, glycol or liquid metal. The following description of porosity control will refer to air as the trapped fluid, since that will be the conditions normally encountered in actual practice, however other fluids are practical. Since air has roughly one thousandth the density of typical build materials the porosity simplifies to:

$$P = 1 - \frac{\rho_{part}}{\rho} \quad \text{[Eq. 2]}$$

The examples that follow primarily consider the building of objects from elements of the same size and shape, such as beads of constant cross section and droplets of constant volume. Mixing elements of different sizes would allow the porosity to span larger ranges.

Consider three examples. In the first example, a part is built with an extrusion based rapid prototyping system depositing beads that are 5% smaller in cross sectional area than what would be required to deposit sufficient material to completely fill the part as specified in the associated CAD file. If the bead diameter required to completely fill the part is 0.015 inches, the actual bead average diameter would be 0.0146 inches. This smaller bead diameter would produce an exterior surface on the part that is displaced into the part on the order of 0.0005 inches. Other than this displacement, the part will be built successfully with a slight mount of air between the beads. Such a part will have a porosity greater than zero due to air gaps between the beads.

In the second example, the same part is built with the extrusion system with a bead cross sectional area size that is 20% smaller than nominal. In this situation there will be some regions of the part where the gaps between the beads are so great that nearest neighbor beads do not touch. Generally, parts manufactured with this bead size will delaminate and functionally fail due to excessive porosity.

In the third example, the same part is built with the extrusion system with a bead cross section area that is 5% larger than that which would entirely fill the part. At each layer of the part, material will be deposited in excess of the volume of the layer. This will typically manifest itself by the height of the part rising faster than the height of the extrusion nozzle. The nozzle will gradually dig further and further into the part, and will eventually knock over features or otherwise cause the part to fail.

The point of the examples is that variations in the amount of material being deposited are practically not detectable as long as the deposition rate is within a narrow range or window. When the rate that material is being applied goes outside of that narrow range, the error is not only un-forgiven, it is integrated.

Referring to FIG. 1, for such a rectangular array 10 of beads or ribbons 14, wherein "a" is the bead height and "b" is the bead width, the maximum porosity $P_{max}$ may be calculated according to the equation:

$$Pmax_{rect-1D} = a/b(1-\pi/4) \equiv a/b \, 0.2146 \leq 0.2146 \qquad [Eq. 3]$$

wherein:

$$a \leq b$$

Figure 2:
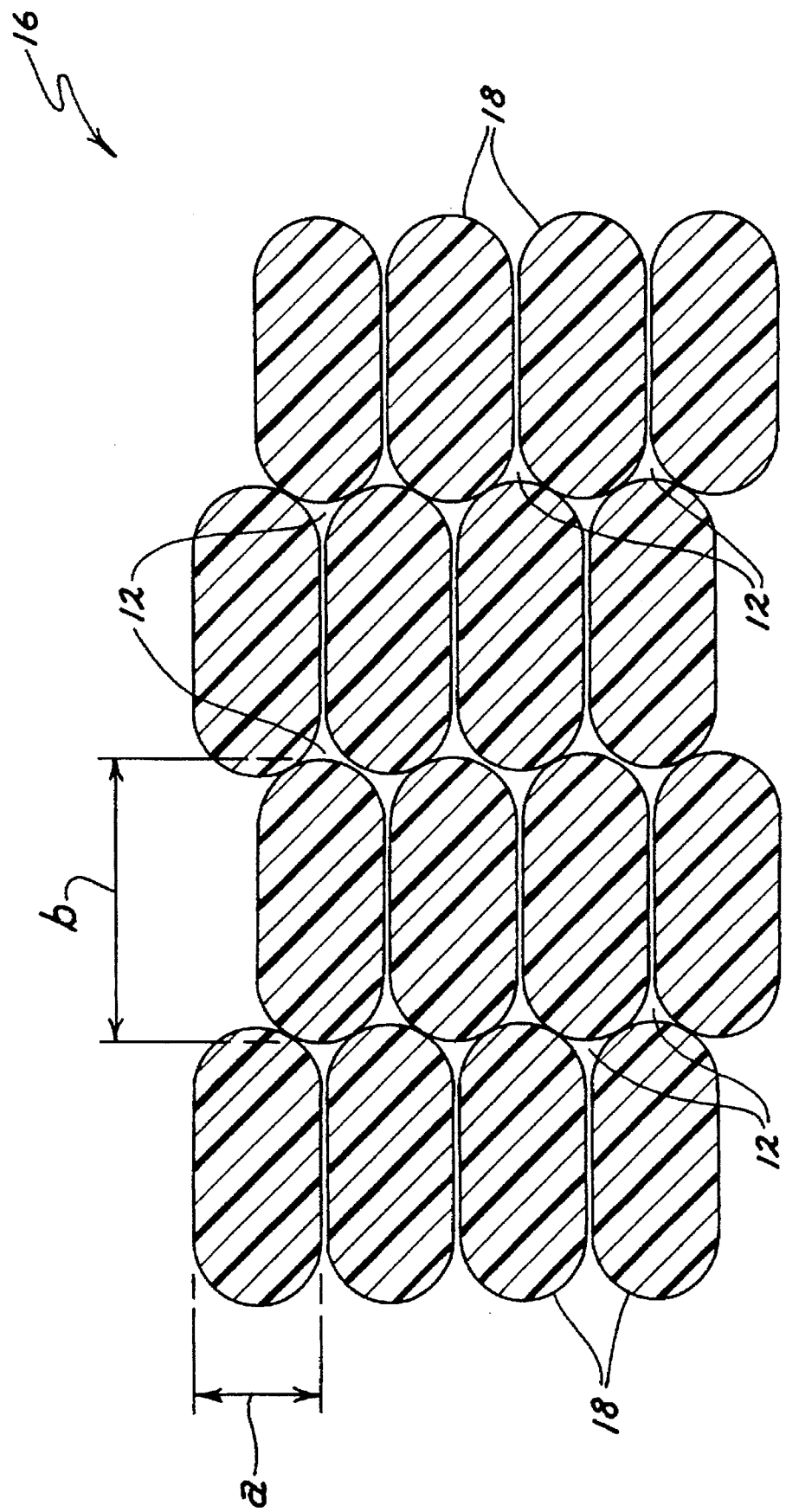
FIG. 2 is a vertical section view of an hexagonal array of beads.

Referring now to FIG. 2, for such an hexagonal array 16 of beads or ribbons 18, where "a" is the bead height and "b" is the bead width, and those dimensions are different, the maximum porosity may be calculated according to the equation:

$$Pmax_{hex-1D} = \frac{a}{2b}\left(\sqrt{3} - \frac{\pi}{2}\right) \equiv \frac{a}{b} \, 0.0806 \leq 0.0931 \qquad [Eq. 4]$$

wherein:

$$a \leq \frac{2b}{\sqrt{3}}$$

The highest porosity condition of approximately 21% exists when the beads are cylindrical in shape, arranged in a square array, and touch at most their four nearest neighbors. This will generally be the case for very stiff or rapidly solidifying materials applied in layers or strata of beads. Under these conditions, the cylindrical shaped beads as extruded will resist deforming into intimate contact with their nearest neighbors. In some cases the beads in adjacent horizontal layers will locally be parallel and laterally offset from each other by half a diameter. In this situation even stiff or rapidly solidifying materials will pack with a porosity of about 9%. Further, bead elements may be deposited in successive horizontal layers in a skew arrangement 50 as to provide a minimum porosity.

Some deformation of cylindrical beads is desirable for overall part strength and internal adhesion. Because it is possible for even rigid cylinders to configure themselves with a 9% porosity, and because most extrusion materials are sufficiently viscous that beads cannot be made to conform so as to make a porosity of less than 1%, an optimal condition for extrusion based porosity is 5%. This gives a process window of plus or minus 4%. If the material is being extruded such that the bead height "a" and width "b" are different and "a" is less than "b", the optimal porosity process window becomes:

$$P \, extrusion_{optimal} = a/b(0.05 \pm 0.04) \qquad [Eq. 5]$$

The tolerance on the dimensions of the extruded bead is roughly half of the porosity tolerance, or 0.02a/b. The optimal porosity range for bead elements extruded in this manner is approximately 2-10%, with an optimal porosity of approximately 5%. Elliptical bead elements may also be used in this form of prototyping.

Beads which are significantly flattened are more difficult to produce because they require greater extrusion accuracy. For example, a road that is four times wider than it is high must be extruded with a volumetric or cross sectional accuracy of plus or minus 1%.

The foregoing discussion gives maximum porosities for bead extrusion rapid prototyping where adjoining beads have line contact, that is where the nearest neighbor beads have parallel axes. Considerably larger porosities are possible if beads are spaced sufficiently far apart within a layer that they do not contact their nearest neighbors. This is possible only if the beads in one layer are not locally parallel to the beads in either adjoining layer. For example, this could be the case if the bead axes are oriented in a system such as a rectangular X-Y system along X in layer 1, Y in layer 2, X in layer 3, and so forth. Under these conditions the process limits previously described give only a maximum lower bound to the porosity.

Ink jet or ballistic particle based rapid prototyping involves depositing droplets or particles of material so as to sequentially build up an object. This is typically implemented in a raster deposition pattern where an array of nozzles deposit droplets 20 of either final part material or support material on every location in a finely spaced rectilinear grid as shown in FIG. 3. Assuming that the height of each such layer is "a", and that the length and width of each grid element are "b" and "c", respectively, the maximum porosity becomes:

$$Pmax_{ortho-3D} = a/bc((1-\pi/4)(b+c) - a(1-\pi/3)) < 0.4765 \qquad [Eq. 6]$$

The highest porosity is achieved for the case where a=b=c. Two other cases of interest are the face centered and body centered cubic lattices. Their maximum porosities are:

$$Pmax_{body} = 1 - \frac{\sqrt{3} \, \pi}{8} \equiv 0.3198 \qquad [Eq. 7]$$

$$Pmax_{face} = 1 - \frac{\sqrt{2} \, \pi}{6} \equiv 0.2595 \qquad [Eq. 8]$$

The closest packing of rigid spheres yields a porosity of about 26%. Since it is difficult to deposit materials even under optimal conditions with porosities of less than 1-2%, this defines the porosity process window for droplet deposition to be 14% plus or minus 12%. If the average height "a" of an impacted droplet is less than its lateral dimension "b", the optimal porosity process window becomes:

$$Pdroplet_{optimal} = a^2/b^2(0.14 \pm 0.12) \qquad [Eq. 9]$$

Equation 9 points out the desirability of printing with nearly round droplets. For example, a typical wax jet printer produces solidified droplets that are about three times wider than they are high. The porosity process window for this type of printing would be 1.6% plus or minus 1.4%. If the volume of the individual droplets cannot reliably be held within a diameter tolerance of plus or minus 1.4%, there will be insufficient space between some of the solidified droplets to take up their volumetric variation, causing the part to build up unevenly. Post deposition machining may be required for flattened droplets while it may be avoidable for nearly symmetric droplets. The tolerance on the dimensions of the extruded droplet is roughly a third of the porosity tolerance, or 0.04(a/b)². For rapid prototyping using elements extruded in this manner, the optimal porosity range is approximately 2-26%, with an optimal porosity of 14%.

Nearly symmetric droplets have an additional advantage in this type of prototyping in that the angle of incidence of the droplet can be altered without substantially changing the shape of the solidified droplet. This is important in deposition systems where the droplet nozzles have orientational degrees of freedom.

Objects are also printed by applying droplets of binder to a powder layer to selectively bond particles together and to the previously constructed object, or by selectively sintering particles. The porosity of these parts is difficult to prescribe, since it is a function of the particle size distribution, the degree of settling, the shapes of the particles, and (in the case of sintering) the amount of fusion of the particles. Residual porosity is desirable for these parts primarily for casting operations, to be described.

The Need for Finite Process Windows

Rapid prototyping systems attempt to miniaturize the entire manufacturing process into a single small space. Desktop rapid prototyping additionally requires that all of the supporting manufacturing engineering expertise usually required to keep a manufacturing process tuned to specified tolerances must be subsumed in the desktop system, so that a casual user can reliably and repeatedly create arbitrary geometries. There are at least four generic ways to make a reliable manufacturing process:

Design an end product that is easy to manufacture. This avenue is generally unavailable in rapid prototyping. The designs of interest are usually printed with a rapid prototyping system exactly because they are difficult to manufacture.

Tightly control all input parameters. This avenue is generally unavailable to desktop rapid prototyping. Ambient air temperature and humidity can vary, the age and condition of the material to be deposited is often not controlled, and there are numerous internal processes in the device such as bearing wear that gradually achieve somewhat unknown states.

Apply active feedback. See for example U.S. Pat. No. 5,303,141.

Use a process with a wide tolerance. If the intrinsic process is insensitive to variations of its input parameters within a defined window, the process can be robust.

Different rapid prototyping techniques have different failure modes that drive the need for a wide process window. Extrusion based rapid prototyping will typically evidence one of the following:

Gas pockets form in the pressurized region of the delivery channel that change size as the pressures are changed. This leads to an unpredictability of the amount of material that will be extruded at a given instant.

If a viscosity pump is used, the amount of material extruded per unit time depends non-linearly on the rate that the pump is being operated. If a gear pump or other quasi-continuous displacement pump is used, there are pulsations or variations in flow rate that also affect the instantaneous deposition rate.

Deposition materials are typically chosen for good self-adhesion, stiffness, and rapid solidification. These same properties can cause the materials to resist filling in crevasses where the radius of the meniscus of the deposited material is small and positive.

Material and pump characteristics change over time. These changes can be due to bearing wear, water absorption, temperature drift, oxidation, and batch to batch material variations.

Errors tend to propagate through a part. Air may blow a bead to an adjacent position, or material may pull away from a corner instead of attaching, or a gas pocket may cause a momentary drop out of the bead. If the material is metered exactly and there is no tolerance for errors, the resulting defect will occur on all subsequent layers of the part, and possibly become worse on subsequent layers.

Porosity to Aid Lost Wax Casting

Lost wax casting allows replicas of a meltable part to be formed with high temperature castable materials. Typically the original part is formed from a wax material. Sprues and vents are added of the wax material to allow the final material to enter and the wax to exit. The part is then coated with several layers of ceramic slurry which is cured to form a hard ceramic shell. The wax part with its shell is put in an oven to melt out most of the wax, and then the final material (such as steel) is poured in to create the part and burn out the residual wax.

Waxes for lost wax casting are specifically formulated to minimally expand prior to softening. Most materials for rapid prototyping expand significantly under the same conditions, primarily due to additional requirements from the rapid prototyping process. Since both the ceramic shell and the material filler are nearly incompressible, differences in their thermal expansion coefficients can generate enough force to crack the ceramic shells.

If non-zero porosity such as by air inclusions is introduced into the prototype part, the porosity will increase the part's compressibility and compensate for differences in thermal expansion coefficients. Assuming that gas trapped in the part pores behaves as an ideal gas, we can calculate the porosity required to keep the pressure from the part from rapturing the shell.

If the thermal expansion coefficient of the bulk prototype part material is $\eta_{material}$, the thermal expansion coefficient of the cured ceramic shell is $\eta_{shell}$, the ambient temperature is $T_{ambient}$, the temperature change required to make the material flow out of the shell is $\Delta T$, the ambient pressure is $Press_{ambient}$, and the maximum pressure that the shell can tolerate from expansion of the material during the heating cycle is $Press_{hot}$, the minimum required porosity is:

$$Pmin = \left( 1 + \frac{\eta_{shell}}{\eta_{material}} + \frac{1 - \left(1 + \frac{\Delta T}{T_{ambient}}\right) \frac{Press_{ambient}}{Press_{hot}}}{3\eta_{material}\Delta T} \right)^{-1} \quad [\text{Eq. 10}]$$

Under most circumstances this can be approximated by:

$$Pmin = \frac{3\eta_{material}\Delta T}{1 - \left(1 + \frac{\Delta T}{T_{ambient}}\right) \frac{Press_{ambient}}{Press_{hot}}} \quad [\text{Eq. 11}]$$

For example, a typical material might have an expansion coefficient of 25 parts per million per degree centigrade, be required to be heated by 150 degrees centigrade above STP to flow out of the mold, and the mold should be able to support one atmosphere of differential pressure from the hot material ($Press_{hot}=2Press_{ambient}$). In this case the minimum required porosity is 4.6%. The porosity requirements for lost wax casting are also compatible with those for reliable part building.

This analysis is independent of the nature of the part porosity as long as it is uniformly distributed through the part and the pores are filled with a gas. It suggests that lost wax casting is possible for materials other than the traditional casting waxes if sufficient porosity has been created in the master part.

A three-dimensional article may therefore be formed by depositing solidifiable material in such a manner as to control the porosity of the resulting part as follows. The dispenser moves in a predetermined pattern, extruding material in a predetermined size and shape. Such dispensing is controlled so as to sequentially deposit elements of material to form a part. The shape of the elements of material and the motion of the dispenser serves to create a part with a porosity content determined by the relationship between extrusion rate and element size and shape. The rate of dispensing the material may be adjusted to provide a range of porosities suitable for the formation of parts of varying characteristics.

Having thus shown the advantages of a deliberate introduction of porosity into rapid prototyping techniques, a method for building parts of predetermined porosity will now be disclosed. When it is desired to make a part of determined porosity, the rate of dispensing elements of material is varied so that the resulting product is of the desired porosity. The material is laid down sequentially by a dispenser onto a receiving surface in a pattern defined by the user. The material elements are deposited in a set position to provide air or other fluid pockets between them. The material dispensation rate may also be adjusted to assist in the formation of a part of predetermined porosity.

The dispenser may be any type of known dispenser used in the rapid prototyping industry, such as a nozzle using a pressurized supply source of material, providing a fluid material source. The pressurized material may be supplied by a positive displacement pump. This dispenser works best for providing bead elements that are elliptical in cross sectional shape. Another type of dispenser that may be used is an ink jet type dispenser that dispenses nearly spherical droplets.

As shown in the figures, bead elements may be deposited in successive horizontal layers so that the beads are in such horizontal and vertical juxtaposition as to be arranged in a rectangular or an hexagonal array. It is understood that beads may be deposited in a large variety of patterns not shown here.

The detailed description outlined above is considered to be illustrative only of the principles of the invention. Numerous changes and modifications will occur to those skilled in the art, and there is no intention to restrict the scope of the invention to the detailed description. The preferred embodiment having been described in detail, the scope if the invention will be defined by the following claims.

What is claimed is:

1. A method of making a three-dimensional article by the deposition of solidifiable material onto a receiving surface, with the article having a predetermined porosity comprising that fractional portion of the article that is devoid of such material, comprising the steps of:

dispensing solidifiable material onto a receiving surface from a dispenser moved in a predetermined pattern to create a three-dimensional article of predetermined size and shape, with dispensing of the material being controlled to sequentially build up the material to form the desired article;

depositing the material in multiple, adjacent elements, with the elements positioned to provide fluid pockets therebetween; and adjusting the rate of dispensing of the material to provide a predetermined porosity in the article thus formed.

2. The method of claim 1 wherein said provided fluid pockets are air filled.

3. The method of claim 1 wherein:

the dispenser is a nozzle, and the material is supplied to the nozzle in a fluid state from a pressurizing supply source;

and extruding the material from the nozzle in the form of continuous beads defining said elements.

4. The method of claim 3 wherein:

the beads are generally elliptical in cross section.

5. The method of claim 3, wherein:

the pressurizing supply source is adjusted to provide a porosity in the article of between 1% and 9%, so as to form an article of a strength sufficient to maintain the integrity of the article.

6. The method of claim 5 wherein:

the pressurizing supply source is adjusted to provide a porosity in the article of approximately 5%.

7. The method of claim 1 wherein:

the dispenser is a droplet dispenser of the ink jet type; and depositing the material in the form of droplets defining said elements.

8. The method of claim 7 wherein:

the droplet dispensing is controlled to provide a porosity in the article of between 2% and 26%.

9. The method of claim 8 wherein:

the droplet dispensing is controlled to provide a porosity in the article of approximately 14%.

10. The method of claim 7 wherein:

the droplets as deposited are substantially spherical in shape.

11. The method of claim 3 and comprising:

supplying the material to the nozzle from a positive displacement pump comprising the pressurizing supply source.

12. The method of claim 3 and comprising:

depositing said bead elements in successive horizontal layers with the beads in such juxtaposition to each other vertically and horizontally as to form a substantially rectangular array in vertical cross section.

13. The method of claim 3 and comprising:

depositing said bead elements in successive horizontal layers with the beads in such juxtaposition to each other vertically and horizontally as to form a substantially hexagonal array.

14. The method of claim 3 and further comprising the step of:

depositing said bead elements in successive horizontal layers, wherein said bead elements are skew to create a predetermined minimum porosity.

15. The method of claim 14 wherein said predetermined minimum porosity is approximately 1%.

16. The method of claim 1 wherein:

the rate of dispensing is adjusted to provide a porosity of between 1% and 21%.

* * * * *